United States Patent
Yamamoto et al.

(10) Patent No.: US 7,190,868 B2
(45) Date of Patent: Mar. 13, 2007

(54) OPTICAL TRANSMISSION LINE

(75) Inventors: Yoshinori Yamamoto, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/359,417

(22) Filed: Feb. 23, 2006

(65) Prior Publication Data

US 2006/0188205 A1  Aug. 24, 2006

(30) Foreign Application Priority Data

Feb. 23, 2005  (JP) ............................ 2005-047853

(51) Int. Cl.
*G02B 6/02* (2006.01)
*H04J 14/02* (2006.01)

(52) U.S. Cl. ................. 385/123; 385/122; 385/11; 385/28; 385/141; 398/81

(58) Field of Classification Search ............... 385/123, 385/124, 126, 127, 128, 141, 142, 144, 28, 385/122, 11; 398/81
See application file for complete search history.

(56) References Cited

U.S. PATENT DOCUMENTS 5,949,533 A * 9/1999 Lee et al. ............... 356/73.1
6,952,519 B2 * 10/2005 Bickham et al. ............ 385/127
6,959,135 B1 * 10/2005 Bickham et al. ............ 385/123
7,082,243 B2 * 7/2006 Bickham et al. ............ 385/127

FOREIGN PATENT DOCUMENTS

JP  6-59141  3/1994  ............. 385/123 X

OTHER PUBLICATIONS

Sugie, T., et al. "A Novel Repeaterless CPFSK Coherent Lightwave System Employing an Optical Booster Amplifier" J. of Lightwave Technology, Sep. 1991, vol. 9, No. 9, pp. 1178-1186.
Mao, X., et al. "Stimulated Brillouin Threshold Dependence on Fiber Type and Uniformity" IEEE Photonics Technology Letters, vol. 4, No. 1, pp. 66-69.

* cited by examiner

*Primary Examiner*—Brian M. Healy
(74) *Attorney, Agent, or Firm*—McDermott Will & Emery LLP

(57) ABSTRACT

Provided is an optical transmission line in which the suppression of SBS and the achievement of other transmission characteristics can compatibly be attained. The optical transmission line is formed by connecting a first optical fiber and a second optical fiber, or by connecting a group of first optical fibers and a group of second optical fibers, in which the difference in Brillouin frequency shift therebetween is 200 MHz or more. In at least one of the first optical fiber and the second optical fiber, the transmission loss may be 0.32 dB/km or less at a wavelength of 1383 nm. In each of the first and second optical fibers, the mode field diameter may be not less than 8.2 μm and not more than 9.8 μm, the cable cutoff wavelength may be equal to or less than 1260 nm, and the zero dispersion wavelength may be not less than 1300 nm and not more than 1324 nm. The difference between the average Brillouin frequency shift of each optical fiber group and the Brillouin frequency shift of each optical fiber contained in the respective optical fiber group may be equal to or less than 40 MHz.

10 Claims, 7 Drawing Sheets

OPTICAL TRANSMISSION LINE

BACKGROUND OF THE INVENTION

1. Field of the Invention

The present invention relates to an optical transmission line which is formed by connecting a plurality of optical fibers.

2. Description of the Background Art

In an optical transmission system, signal light which is transmitted from an optical transmitter travels through an optical transmission line comprised of optical fibers and is received by an optical receiver. Between the optical transmitter and the optical receiver, there is provided an optical repeater which includes an optical amplifier for optically amplifying signal light and an optical branching device, etc. For complying with an expansion of relay interval and an increase in the number of branches in such an optical transmission system, the power of signal light which enters into the optical transmission line must be enhanced. However, it has been a problem that even if the incident power of signal light is enhanced, the optical power to be propagated through an optical fiber is limited because of back-scattering light that is caused by stimulated Brillouin scattering (SBS) while the signal light travels through the optical fiber. The SBS is one of nonlinear phenomena.

The incident optical power level in which back-scattering light occurs conspicuously to the extent that cannot be ignored is called as a SBS threshold. Theoretically, a SBS threshold $P_{th}$ is expressed by formulas 1a and 1b:

$$P_{th} = 21 \frac{K_0 A_{eff}}{G(v_{max})} \quad (1a)$$

$$G(v) = \int_0^L g_B(v,z) \exp(-az) dz \quad (1b)$$

where $K_0$ is a constant depending on polarization, $A_{eff}$ is an effective core area of an optical fiber, $G(v)$ is an effective Brillouin gain coefficient at a Brillouin frequency shift $v$, $v_{max}$ is a Brillouin frequency shift in which $G(v)$ becomes maximum, $g_B(v, z)$ is a Brillouin gain coefficient at a position z in the longitudinal direction, $\alpha$ is a loss coefficient of an optical fiber, and L is a fiber length.

A known method for suppressing SBS is a method in which a plurality of optical fibers that differ from each other in terms of Brillouin frequency shift are connected in cascade connection. An optical transmission line described in T. Sugie, et al, J. Lightwave Techn., Vol. 9, No. 9, pp. 1178–1186 (1991) (Document 1) is formed by connecting four optical fibers whose Brillouin frequency shift are 10.92 GHz, 10.90 GHz, 10.80 GHz, and 10.90 GHz, respectively. An optical transmission line described in X. P. Mao, et al., IEEE Photonics Techn. Lett., Vol. 4, No. 1, pp. 66–69 (1992) (Document 2) is formed by connecting, in cascade connection, 10 or more optical fibers which differ from each other in terms of Brillouin frequency shift.

Conventional optical transmission lines are such that SBS can be suppressed whereas no consideration is given to other transmission characteristics (e.g., low OH absorption loss, conformity to international standards, low OTDR measurement error, etc.). In other words, the Brillouin frequency shift of an optical fiber can be adjusted by changing the refractive index profile of the optical fiber, but the other transmission characteristics also change at the same time.

SUMMARY OF THE INVENTION

The object of the present invention is to provide an optical transmission line in which the suppression of SBS and the achievement of other transmission characteristics can compatibly be attained.

In order to achieve the object, an optical transmission line which is formed by connecting a first optical fiber and a second optical fiber is provided. In this optical transmission line, the difference in Brillouin frequency shift between the first optical fiber and the second optical fiber is 200 MHz or more, and the transmission loss of at least one of the first optical fiber and the second optical fiber is 0.32 dB/km or less at a wavelength of 1383 nm.

In an optical transmission line according to another aspect of the invention, the difference between the Brillouin frequency shift of a first optical fiber and that of a second optical fiber is equal to or more than 200 MHz, the mode field diameter of each of the first and second optical fibers is not less than 8.2 μm and not more than 9.8 μm, the cable cutoff wavelength of each of the first and second optical fibers is equal to or less than 1260 nm, and the zero dispersion wavelength of each of the first and second optical fibers is not less than 1300 nm and not more than 1324 nm.

In an optical transmission line according to yet another aspect of the invention, the difference between the Brillouin frequency shift of the first optical fiber and that of the second optical fiber is equal to or more than 200 MHz, the value of parameter K is equal to or less than 0.2 dB, and the absolute value of the difference between A1 and A2 is greater than 0.03 dB/km/μm⁴, when K is defined by the following formulas 2a, 2b, and 2c:

$$X = 1 - 10^{-\frac{A1}{10\lambda^4}} \quad (2a)$$

$$Y = 1 - 10^{-\frac{A2}{10\lambda^4}} \quad (2b)$$

$$K = \left| 5\log_{10}\left(\frac{X}{Y}\right) + 10\log_{10}\left(\frac{B2}{B1}\right) \right| \quad (2c)$$

where A1 is a Rayleigh scattering coefficient of the first optical fiber, B1 is a mode field diameter of the first optical fiber at a wavelength $\lambda$, A2 is a Rayleigh scattering coefficient of the second optical fiber, B2 is a mode field diameter of the second optical fiber at a wavelength $\lambda$, and $\lambda$ is a wavelength in the wavelength range of 1260 nm to 1625 nm.

In an optical transmission line according to further aspect of the invention, a group of first optical fibers and a group of second optical fibers are connected, and the difference between an average Brillouin frequency shift v1 of the first optical fiber group and an average Brillouin frequency shift v2 of the second optical fiber group is equal to or more than 200 MHz, whereas the difference between v1 and the Brillouin frequency shift of each optical fiber in the first optical fiber group including two or more optical fibers is equal to or less than 40 MHz, and the difference between v2 and the Brillouin frequency shift of each optical fiber in the second optical fiber group including two or more optical fibers is equal to or less than 40 MHz.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
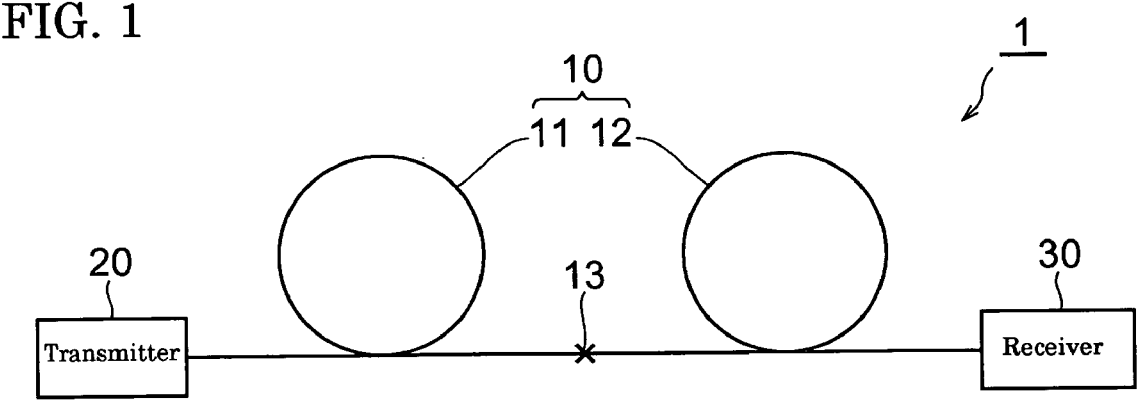
FIG. 1 is a schematic diagram of an optical transmission system that includes an optical transmission line according to the first embodiment of the present invention.

In the following, preferred embodiments of the present invention will be explained in detail with reference to the accompanying drawings. In the explanation of the drawings, the same reference numerals denote the same parts, and a repeated explanation will be omitted.

FIG. 1 is a schematic diagram of an optical transmission system 1 which includes an optical transmission line 10 according to a first embodiment of the present invention. In the optical transmission system 1, the optical transmission line 10 is provided between an optical transmitter 20 and an optical receiver 30. The optical transmission line 10 is constituted of a first optical fiber 11 and a second optical fiber 12 which are fusion-spliced together. The first optical fiber 11 and the second optical fiber 12 may be installed between the optical transmitter 20 and the optical receiver 30, or they may be wound around in a coil form so as to be modularized.

In the optical transmission system 1, signal light discharged from the optical transmitter 20 reaches the optical receiver 30 via the first optical fiber 11 and the second optical fiber 12 and is received by the optical receiver 30. Here, the wavelength λ of signal light is included in the wavelength range of 1260 nm to 1625 nm. Also, signal light of multi-wavelengths which are contained in this wavelength range may be transmitted.

The difference between the Brillouin frequency shift of the first optical fiber 11 and that of the second optical fiber 12 is equal to or more than 200 MHz. The optical transmission line 10 constituted by connecting the first optical fiber 11 and the second optical fiber 12 which have such characteristics can sufficiently suppress SBS, and accordingly it is possible to enhance the power of signal light discharged from the optical transmitter 20 and to increase a span between the optical transmitter 20 and the optical receiver 30.

When light is incident from the respective ends of the optical transmission line 10, the difference of SBS threshold values between the respective directions may be equal to or less than 2 dB. The polarization mode dispersion in each of the optical fibers 11 and 12 may be equal to or less than 0.2 ps/km$^{1/2}$. The transmission loss in either one of the optical fibers 11 and 12 may be 0.176 dB/km or less at the wavelength of 1550 nm. When any of the optical fibers 11 and 12 is wound by 10 turns at a diameter of 30 mm, the loss increment at the 1550 nm wavelength due to bend may be equal to or less than 0.5 dB. In any of the optical fibers 11 and 12, the cladding region may be doped with Fluorine, and preferably the core region should not be doped with $GeO_2$. In these cases, the optical transmission line 10 can transmit signal light efficiently.

In the embodiment 1, the transmission loss of at least one of the first optical fiber 11 and the second optical fiber 12 may be 0.32 dB/km or less at the 1383 nm wavelength, and the transmission loss of both of the first optical fiber 11 and the second optical fiber 12 may be 0.32 dB/km or less at the 1383 nm wavelength.

A transmission system that uses a Raman amplifier is proposed as technology for amplifying power of signal light. In this transmission system, in order to amplify signal light at C-band (wavelength 1530 nm–1565 nm), which is most used for optical fiber communication, it is required to set the wavelength of the pump light source to E-band (wavelength 1360 nm–1460 nm). However, in the case of conventional optical fibers, pump light power suffers from attenuation by the OH absorption loss which has a peak at the 1383 nm wavelength, and accordingly the amplification efficiency is inevitably decreased.

Likewise, a video overlay PON system is proposed in which one optical fiber transmits an upward IP signal of 1310 nm wavelength, a downward IP signal of 1490 nm wavelength, and an analog video signal of 1550 nm wavelength altogether. This transmission system requires suppression of SBS since the analog video signal needs high power. The transmission system also requires the OH absorption loss of the optical fiber to be low since the downward IP signal is attenuated because of the tail of the OH absorption loss being partially at the 1490 nm wavelength.

Therefore, these transmission systems are considered to require suppression of the SBS as well as suppressing the OH absorption loss. In the optical transmission line 10 according to the first embodiment, both the effect of SBS suppression and the reduction of OH absorption loss can compatibly be achieved.

In the first embodiment according to another aspect of the invention, the mode field diameter at the 1310 nm wavelength of each of the first optical fiber 11 and the second optical fiber 12 may be equal to or more than 8.2 μm and less than or equal to 9.8 μm, the cable cutoff wavelength of each of the first optical fiber 11 and the second optical fiber 12 may be equal to or less than 1260 nm, and the zero dispersion wavelength of each of the first optical fiber 11 and the second optical fiber 12 may be equal to or more than 1300 nm and equal to or less than 1324 nm.

For obtaining optical fibers having a different Brillouin frequency shift, it is generally effective to change dopant concentration of the optical fibers. However, in the conventional technique, if the dopant concentration is changed, the other fiber optics characteristics (for example, a mode field diameter, a cutoff wavelength, dispersion characteristics, and transmission loss) would also change. Therefore, even if a conventional technique can suppress the SBS, it would be difficult to apply it for making an expansion of an installed transmission line (mostly single mode fibers according to recommendation of international standard ITU-T G.652), because thereby other characteristics would also be changed, differing from the ITU-TG.652 standard, which results in problems with respect to transmission characteristics and affinity with the peripheral devices.

Moreover, in the case of technology described in the document 1, a special fiber section must be added to the front-end of the optical transmission line, and consequently the SBS suppression effect cannot be obtained at all with incidence from the opposite direction. This remarkably decreases the degree of freedom in designing the transmission line.

In the optical transmission line 10 according to the first embodiment, the optical fibers 11 and 12 are based on the ITU-T G.652 standard and they can be handled in the completely same manner as a conventional single mode fiber with respect to fiber characteristics except for the SBS.

Also, the effect of suppressing the SBS can be obtained more as compared with the single fiber, regardless of incident direction and length ratio. That is, the effect of improving the SBS of an existing optical transmission line by adding the optical transmission line 10 (or, either of the optical fibers 11 and 12) according to the first embodiment to the existing optical transmission line constituted of single mode fibers.

In the first embodiment according to yet another aspect of the invention, the value of parameter K may be equal to or less than 0.2 dB, and the absolute value of the difference between A1 and A2 may be greater than 0.03 dB/km/μm⁴, when K is defined by the following formulas 2a, 2b, and 2c:

$$X = 1 - 10^{-\frac{A1}{10\lambda^4}} \quad (2a)$$

$$Y = 1 - 10^{-\frac{A2}{10\lambda^4}} \quad (2b)$$

$$K = \left| 5\log_{10}\left(\frac{X}{Y}\right) + 10\log_{10}\left(\frac{B2}{B1}\right) \right| \quad (2c)$$

where A1 is a Rayleigh scattering coefficient of the first optical fiber, B1 is a mode field diameter of the first optical fiber at a wavelength $\lambda$, A2 is a Rayleigh scattering coefficient of the second optical fiber, B2 is a mode field diameter of the second optical fiber at a wavelength $\lambda$, and $\lambda$ is a wavelength in the wavelength range of 1260 nm to 1625 nm.

When an optical transmission line is comprised of a plurality of optical fibers connected together, the splicing loss must be as small as possible. The splicing loss can be measured with an optical time domain reflectometer (OTDR). In the OTDR examination, pulse examination light is made incident on one end of the optical transmission line, and back-scattering light that is generated at each position while the pulse examination light propagates through an optical transmission line is detected in the one end. Then, the distribution of loss in the longitudinal direction of the optical transmission line is obtained based on the time variation of the intensity of the back-scattering light.

When an optical fiber and another optical fiber is spliced together, the strength of scattering light around the spliced point is measured by the OTDR examination. If the difference in the strength of the scattering light is small, splicing is judged to have been performed well. On the other hand, if the difference in the strength of the scattering light is significant, the splicing is judged to be failure and the splicing work is performed again.

When an optical transmission line is constructed by connecting a plurality of optical fibers so as to improve the characteristics thereof, and pulse examination light is made incident on the optical transmission line from a first end thereof, there are cases where the actual value of the splicing loss is large even if the difference in the strength of the scattering light as obtained by the OTDR examination is small. In contrast with this, there are cases where the actual value of the splicing loss is small even if the difference in the strength of the scattering light is large. That is, possibly an error is included in a value $\beta_1$ of the splicing loss as obtained by measuring the difference in the strength of the scattering light when the pulse examination light is made incident onto the optical transmission line from the first end thereof.

Therefore, in order to obtain a more precise measurement value of the splicing loss, an average $\beta(=(\beta_1+\beta_2)/2)$ of splicing losses $\beta_1$ and $\beta_2$ is sought by obtaining a value $\beta_2$ of the splicing loss from the difference in the strength of the scattering light when pulse examination light is made incident onto the optical transmission line from the second end thereof. Thus, by taking an average, a more precise splicing loss $\beta$ can be obtained. In this case, however, the OTDR examination equipment must be prepared for each end side of the optical transmission line, and consequently the system cost becomes high, and also the measurement takes time.

In the optical transmission line 10 according to the first embodiment, the value of the parameter K which is expressed by formulas 3a, 3b, and 3c is made equal to or less than 0.2 dB, and the absolute value of the difference between A1 and A2 is made larger than 0.03 dB/km/μm⁴, and thereby it is made possible to measure splicing loss more precisely even in the case where the OTDR examination is conducted by making pulse examination light incident only from one end side thereof.

Figure 2:
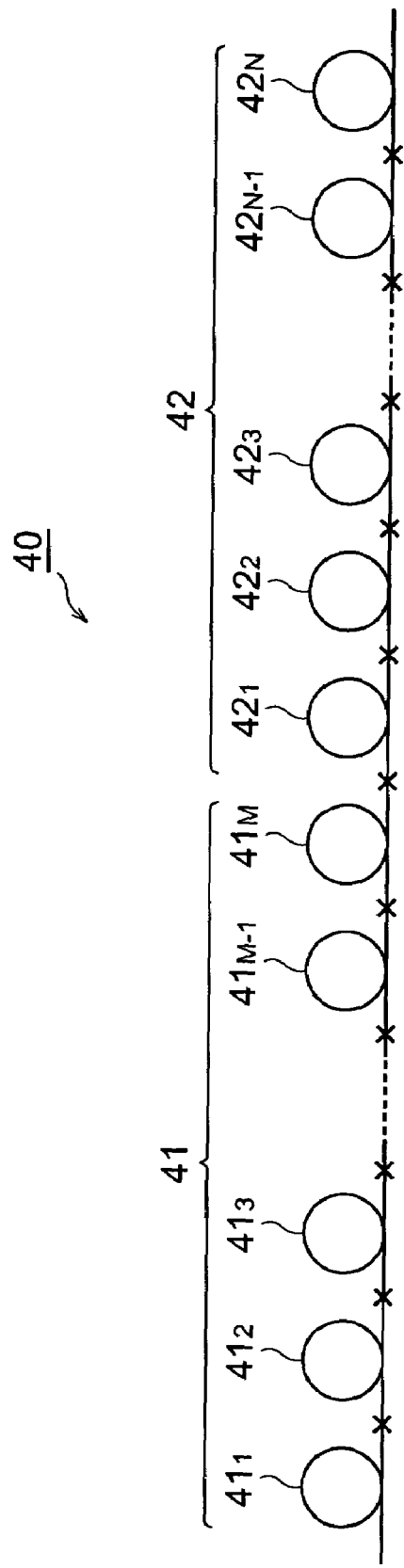
FIG. 2 is a schematic diagram of an optical transmission line according to the second embodiment of the present invention.

FIG. 2 is a schematic diagram of an optical transmission line 40 according to a second embodiment of the present invention. The optical transmission line 40 is constructed by connecting a first optical fiber group 41 and a second optical fiber group 42 together. The first optical fiber group 41 is composed by making cascade connection of M number of optical fibers $41_1$–$41_M$. Likewise, the second optical fiber group 42 is composed by making cascade connection of N number of optical fibers $42_1$–$42_N$. Here, M and N are integers which are equal to or more than 2.

The absolute value of the difference (v1–v2) between the average Brillouin frequency shift v1 of the first optical fiber group and the average Brillouin frequency shift v2 of the second optical fiber group is equal to or more than 200 MHz. The difference between v1 and the Brillouin frequency shift of each optical fiber in the first optical fiber group 41 including M number of optical fibers is equal to or less than 40 MHz. Also, the difference between v2 and the Brillouin frequency shift of each optical fiber in the second optical fiber group 42 including N number of optical fibers is equal to or less than 40 MHz.

In the optical transmission line 40 which is made by connecting the first optical fiber group 41 and the second optical fiber group 42, the SBS can be suppressed sufficiently, and accordingly the power of incident signal light can be increased, thereby allowing the relay span to be increased. Thus, it is possible to suppress the SBS of an optical transmission line by using only two kinds of optical fiber groups. Since it is difficult to obtain an optical fiber having a unit length exceeding 50 km, each optical fiber group may be composed of plural optical fibers when the distance of the optical transmission line is long. In this case, it is unnecessary to join one kind of optical fiber with another kind of optical fiber alternately, but each kind of optical fiber group can be formed as a fiber group by connecting the respective kind of fibers.

When light is incident from each end of the optical transmission line 40, the difference of SBS threshold values between the directions may be equal to or less than 2 dB. The polarization mode dispersion in each of the optical fibers $41_1$–$41_M$ and $42_1$–$42_N$ may be equal to or less than 0.2 ps/km$^{1/2}$. The transmission loss in either one of the optical fibers $41_1$–$41_M$ and $42_1$–$42_N$ at the wavelength of 1550 nm may be 0.176 dB/km or less. When either of the optical fibers $41_1$–$41_M$ and $42_1$–$42_N$ is wound by 10 turns at a diameter of 30 mm, the loss increment at the 1550 nm wavelength due to bend may be equal to or less than 0.5 dB. In either of the optical fibers $41_1$–$41_M$ and $42_1$–$42_N$, the cladding region may be doped with Fluorine, and preferably the core region should not be doped with GeO$_2$. In these cases, the optical transmission line 40 can transmit signal light efficiently.

CONCRETE EXAMPLES

Examples of the optical transmission line 10 according to the first embodiment will be described with reference to FIG. 3–FIG. 5 and FIG. 6A. The optical transmission line 10 adopted as the examples is assumed to be formed by connecting a first optical fiber 11 of 9.1 km length and a second optical fiber 12 of 10.4 km length together.

Figure 6A:
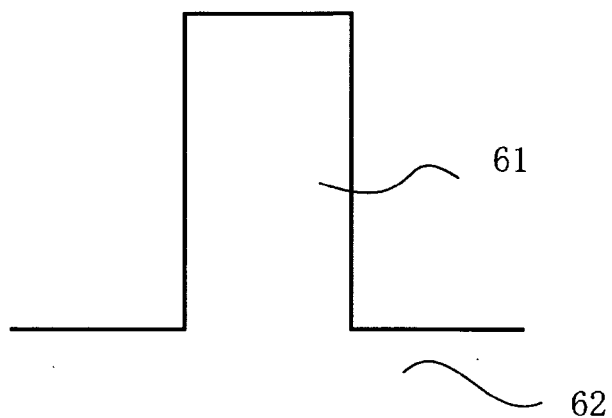
FIG. 6A to FIG. 6C are schematic diagrams showing an example of refractive index profile of an optical fiber respectively which is contained in an optical transmission line according to the first embodiment.

Table I shows specifications of the first optical fiber 11 and the second optical fiber 12. FIG. 6A is a schematic diagram showing a refractive index profile of the first optical fiber 11 and the second optical fiber 12. The first optical fiber 11 and the second optical fiber 12 consist of a core 61 and a cladding 62 respectively.

TABLE I

| | | Optical fiber 11 | Optical fiber 12 |
|---|---|---|---|
| Core material | | Pure silica | Germanium added silica |
| Cladding material | | Fluorine added silica | Pure silica |
| Relative refractive index difference | % | 0.395 | 0.35 |
| Core diameter | μm | 8.2 | 8.6 |
| Mode field diameter at 1310 nm | μm | 8.66 | 9.19 |
| Brillion frequency shift | GHz | 11.1 | 10.8 |
| Cable cutoff wavelength | nm | 1193 | 1174 |
| Zero dispersion wavelength $\lambda_0$ | nm | 1307 | 1313 |
| Dispersion slope at $\lambda_0$ | ps/nm$^2$/km | 0.079 | 0.086 |
| Loss at 1310 nm | dB/km | 0.289 | 0.33 |
| Loss at 1383 nm | dB/km | 0.247 | 0.305 |
| Loss at 1550 nm | dB/km | 0.17 | 0187 |
| Bend loss at 1550 nm (Bending radius 15 mm, 10 turns) | dB | 0.03 | 0.16 |
| PMD | ps/$\sqrt{\text{km}}$ | 0.03 | 0.03 |

Figure 3:
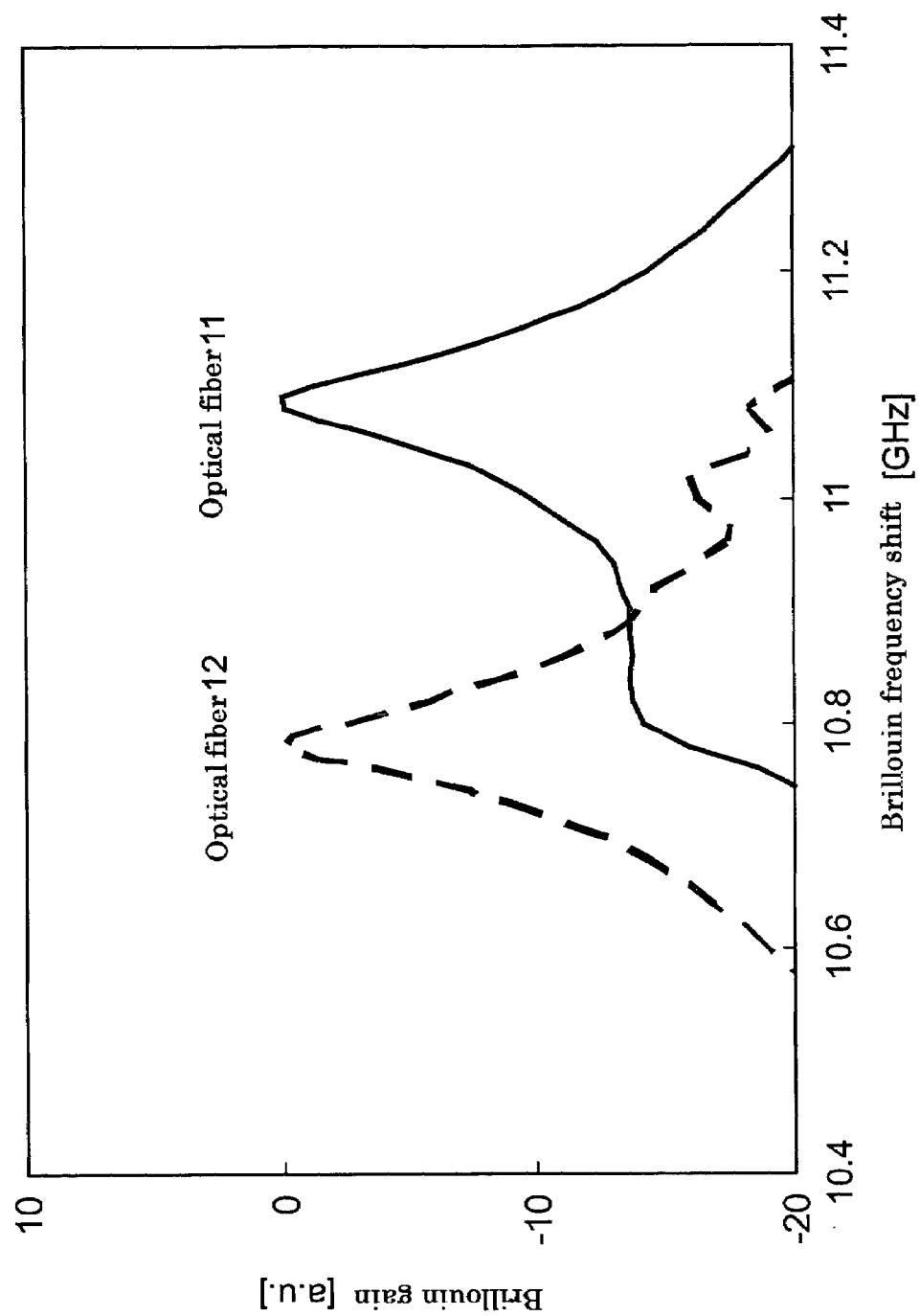
FIG. 3 is a graph showing the Brillouin gain spectrum of each of the first optical fiber and the second optical fiber in an optical transmission line according to the first embodiment.

FIG. 3 is a graph showing the Brillouin gain spectrums of the first optical fiber 11 and the second optical fiber 12 which constitute the optical the transmission line 10. As shown in FIG. 3, the Brillouin gain of the first optical fiber 11 reaches a peak at 11.1 MHz of Brillouin frequency shift. Also, the Brillouin gain of the second optical fiber 12 reaches a peak at 10.8 MHz of Brillouin frequency shift.

Figure 4:
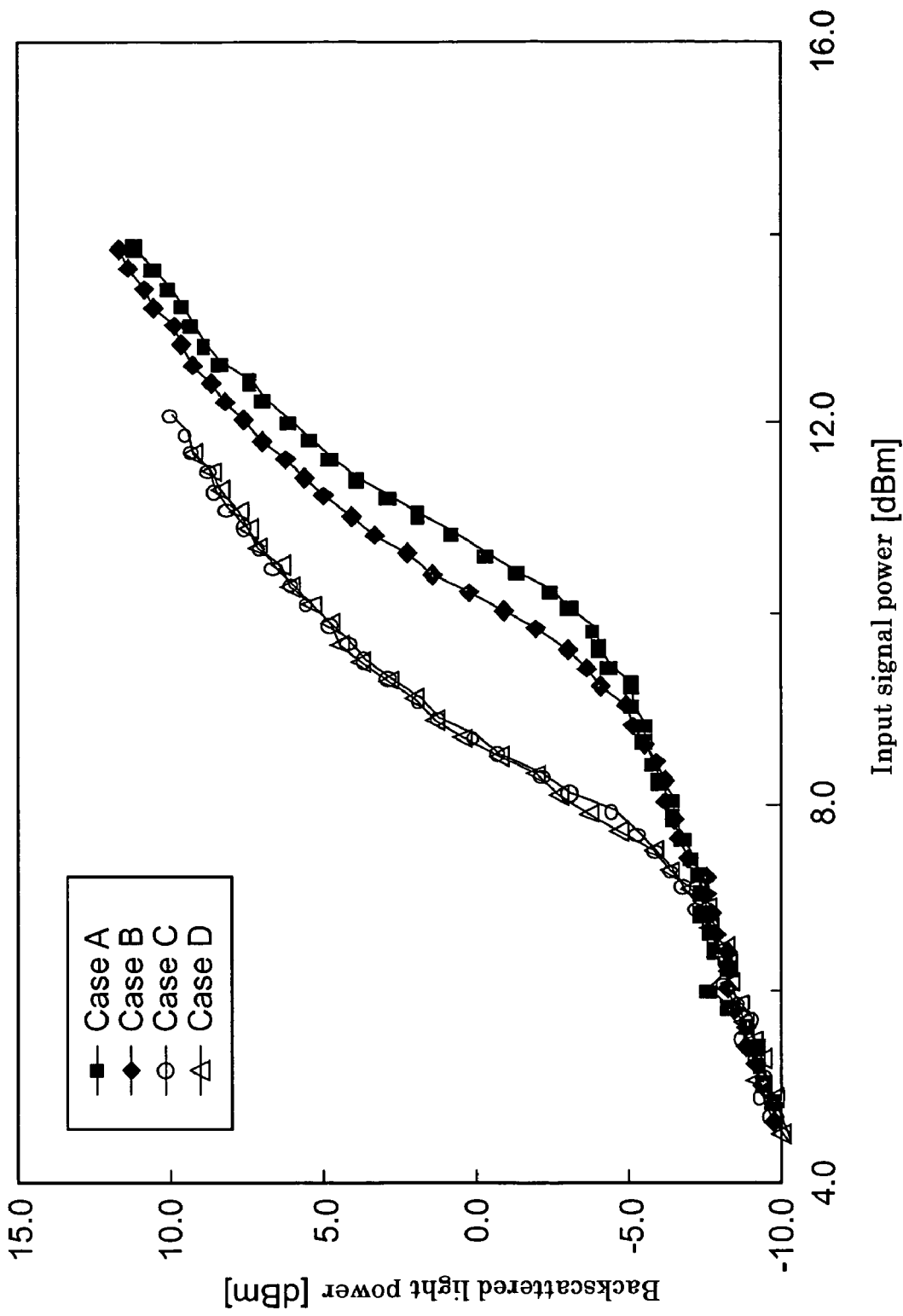
FIG. 4 is a graph showing the relationships between incident signal light power and back-scattering light power in an optical transmission line according to the first embodiment.

FIG. 4 is a graph showing relationships between signal light power incident on the optical transmission line 10, etc. and the back-scattering light power thereof. In FIG. 4, relationships between the incident signal light power and the back-scattering light power are shown with regard to the following cases: signal light is made incident on the optical transmission line 10 from the end of the first optical fiber 11 side (case A); signal light is made incident on the optical transmission line 10 from the end of the second optical fiber 12 side (case B); signal light is made incident on the first optical fiber 11 of 19.5 km length itself (case C); and signal light is made incident on the second optical fiber 12 of 19.5 km length itself (case D). As shown in FIG. 4, the back-scattering light power of the optical transmission line 10 is reduced as compared with the first optical fiber 11 itself and the second optical fiber 12 itself.

Figure 6B:
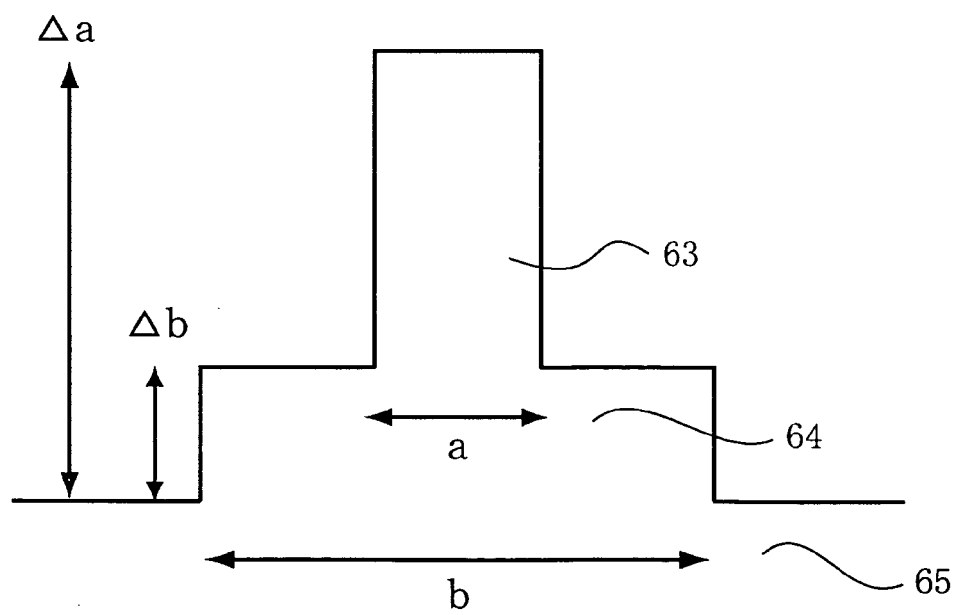
Figure 6C:
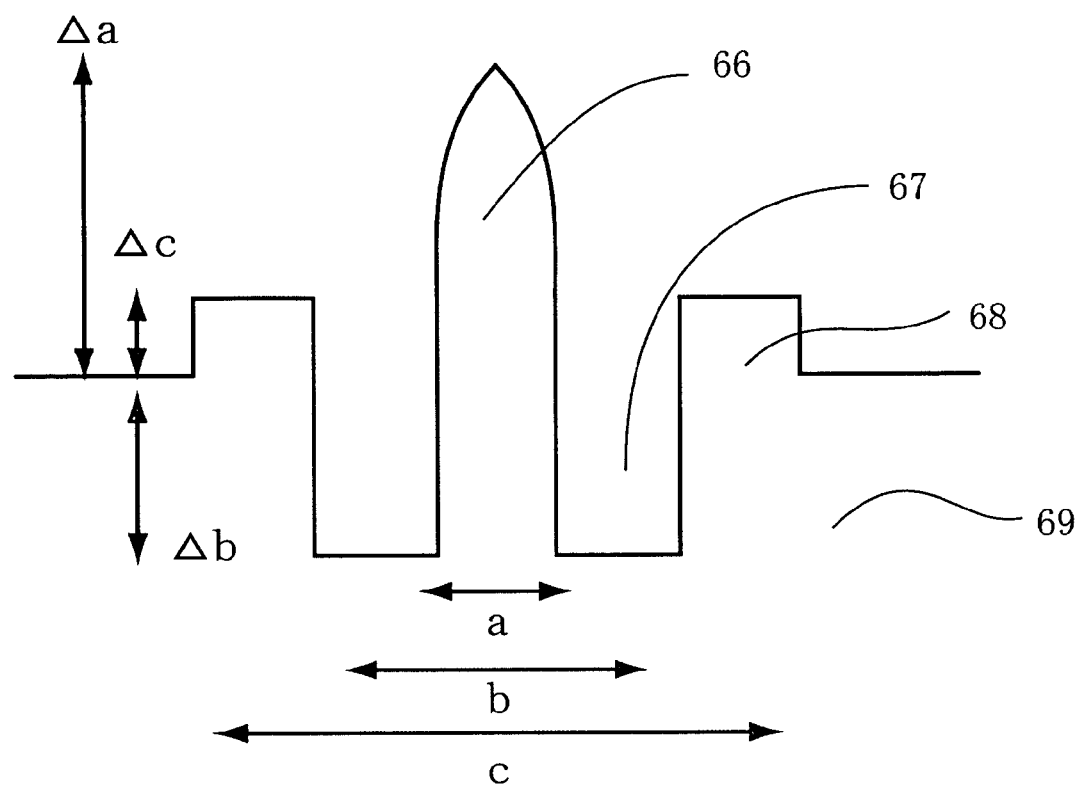

Table II shows the specifications of other optical fibers, optical fiber A to optical fiber E, which are contained in another example of the optical transmission line according to the optical transmission line 10. FIG. 6A shows the refractive index profiles of optical fibers A, B, D, FIG. 6B shows the refractive index profile of optical fibers C, and FIG. 6C shows the refractive index profile of optical fibers E. The optical fibers A, B, and D consist of a core 61 and a cladding 62 respectively. The optical fiber C consists of an inner core 63, outer core 64, and a cladding 65. The optical fiber E consist of a core 66, trench 67, ridge 68, and a cladding 69.

TABLE II

| Optical fiber | | A | B | C | D | E |
|---|---|---|---|---|---|---|
| Core material | | Germanium added silica | Germanium added silica | 63: Germanium added silica, 64: Germanium added silica | Pure silica | 66: Germanium added silica, 67: Fluorine added silica, 68: Germanium added silica |
| Cladding material | | Pure silica | Pure silica | Pure silica | Fluorine added silica | Pure silica |
| Relative refractive index difference % | | 0.43 | 0.76 | Δa: 0.86, Δb: 0.12 | 0.42 | Δa: 2.7, Δb: −0.7, Δc: 0.3 |
| Core diameter | μm | 8.5 | 5.8 | a: 3.3, b: 17.3 | 9.22 | a: 2.9, b: 7.2, c: 14.4 |
| Mode field diameter | μm | 8.6 at 1310 nm | 6.3 at 1310 nm | 8.1 at 1550 nm | 10.0 at 1550 nm | 4.4 at 1550 nm |
| Brillion frequency shift | GHz | 10.7 | 10.5 | 10.5 | 11.1 | 10.1 |
| Cable cutoff wavelength | nm | ≦1260 | ≦1260 | ≦1260 | 1353 | — |
| Zero dispersion wavelength | nm | 1300–1324 | — | 1551 | 1285 | — |
| Loss at 1310 nm | dB/km | 0.33 | 0.5 | 0.39 | 0.3 | — |
| Loss at 1383 nm | dB/km | 0.3 | — | 0.43 | 0.43 | — |
| Loss at 1550 nm | dB/km | 0.187 | ≦0.3 | 0.21 | 0.174 | — |
| Bend loss at 1550 nm (Bending radius 15 mm, 10 turns) | dB | 0.03 | ≦0.01 | — | <0.01 | — |
| PMD | ps/√km | 0.03 | <0.2 | <0.2 | 0.05 | 0.2 |

Table III shows the specifications of the first optical fiber 11 and the second optical fiber 12 which are contained in yet another example of the optical transmission line 10.

TABLE III

| | | Example 1 | Example 2 |
|---|---|---|---|
| v1 | GHz | 10.8 | 10.8 |
| v2 | GHz | 11.1 | 11.1 |
| A1 | dB/km/μm$^4$ | 0.94 | 0.98 |
| A2 | dB/km/μm$^4$ | 0.87 | 0.87 |
| A1 − A2 | dB/km/μm$^4$ | 0.07 | 0.11 |
| B1 | μm | 10.35 | 10.40 |
| B2 | μm | 10.10 | 9.80 |
| B2/B1 | | 0.98 | 0.94 |
| K value | dB | 0.06 | 0.01 |

In Table III, v1 is a Brillouin frequency shift of the first optical fiber 11, and v2 is a Brillouin frequency shift of the second optical fiber 12.

Figure 5:
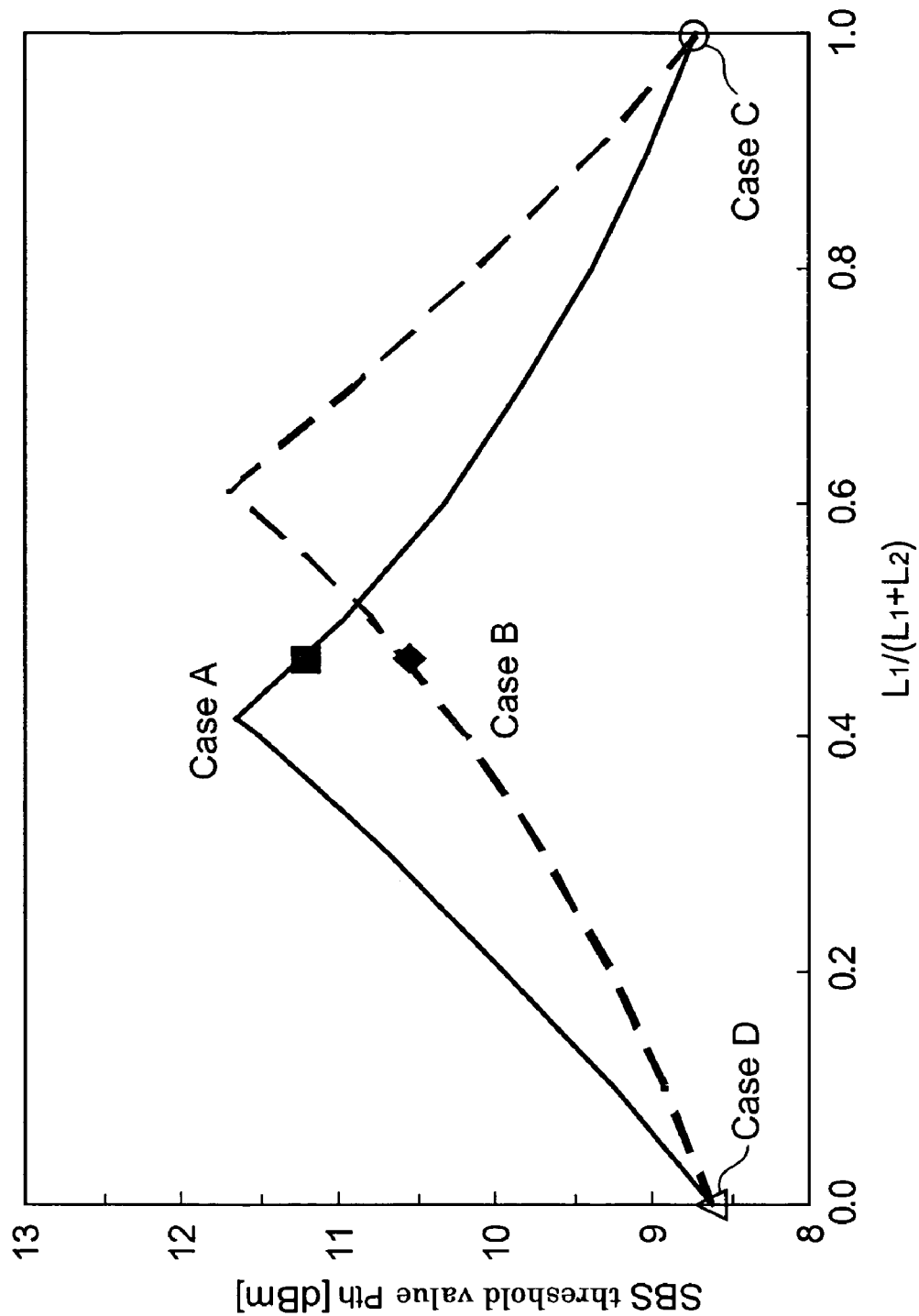
FIG. 5 is a graph showing relationships between an SBS value $P_{th}$ and the length ratio of the first optical fiber and the second optical fiber which are contained in an optical transmission line according to the first embodiment.

FIG. 5 is a graph which shows the relationship between an SBS threshold value $P_{th}$ and a length ratio of the first optical fiber 11 and the second optical fiber 12 which are contained in the optical transmission line 10. Here, the length of the first optical fiber 11 is represented by $L_1$, the length of the second optical fiber 12 is represented by $L_2$, and the sum $(L_1+L_2)$ of these lengths is 19.5 km. The abscissa is the length ratio $(L_1/(L_1+L_2))$. The instances shown in FIG. 5 are a case where signal light is made incident on the optical transmission line 10 from the end of the first optical fiber 11 side (case A) and a case where signal light is made incident on the optical transmission line 10 from the end of the second optical fiber 12 side (case B).

As shown in FIG. 5, in the case where the length $L_1$ of the first optical fiber 11 is 9.1 km and the length $L_2$ of the second optical fiber 12 is 10.4 km and the length ratio is 0.47, the SBS threshold value $P_{th}$ when signal light is made incident on the optical transmission line 10 from the end of the first optical fiber 11 side is 11.2 dB, and the SBS threshold value $P_{th}$ when signal light is made incident on the optical transmission line 10 from the end of the second optical fiber 12 side is 10.6 dB. Also, the SBS threshold value $P_{th}$ when signal light is made incident on the first optical fiber 11 of 19.5 km length itself is 8.7 dB, and the SBS threshold value $P_{th}$ when signal light is made incident on the second optical fiber 12 of 19.5 km length itself is 8.6 dB.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2005-047853 filed on Feb. 2, 2005 including specification, claims drawings and summary are incorporated herein by reference in its entirety.

What is claimed is:

1. An optical transmission line formed by connecting a first optical fiber and a second optical fiber,
   wherein the difference in Brillouin frequency shift between the first optical fiber and the second optical fiber is 200 MHz or more, and the transmission loss of at least one of the first optical fiber and the second optical fiber is 0.32 dB/km or less at a wavelength of 1383 nm.

2. An optical transmission line formed by connecting a first optical fiber and a second optical fiber,
   wherein the difference in Brillouin frequency shift between the first optical fiber and the second optical fiber is 200 MHz or more, the mode field diameter at the 1310 mm wavelength of each of the first and second optical fibers is not less than 8.2 μm and not more than 9.8 μm, the cable cutoff wavelength of each of the first and second optical fibers is equal to or less than 1260 nm, and the zero dispersion wavelength of each of the first and second optical fibers is not less than 1300 nm and not more than 1324 nm.

3. An optical transmission line formed by connecting a first optical fiber and a second optical fiber,
   wherein the difference in Brillouin frequency shift between the first optical fiber and the second optical fiber is 200 MHz or more, the value of parameter K is equal to or less than 0.2 dB, and the absolute value of the difference between A1 and A2 is greater than 0.03 dB/km/μm$^4$, when K is defined by the following formulas 2a, 2b, and 2c:

$$X = 1 - 10^{-\frac{A1}{10\lambda^4}} \quad (2a)$$

$$Y = 1 - 10^{-\frac{A2}{10\lambda^4}} \quad (2b)$$

$$K = \left| 5\log_{10}\left(\frac{X}{Y}\right) + 10\log_{10}\left(\frac{B2}{B1}\right) \right| \quad (2c)$$

where A1 is a Rayleigh scattering coefficient of the first optical fiber, B1 is a mode field diameter of the first optical fiber at a wavelength $\lambda$, A2 is a Rayleigh scattering coefficient of the second optical fiber, B2 is a mode field diameter of the second optical fiber at a wavelength $\lambda$, and $\lambda$ is a wavelength in the wavelength range of 1260 nm to 1625 nm.

4. An optical transmission line formed by connecting a group of first optical fibers and a group of second optical fibers together,
wherein the difference between an average Brillouin frequency shift v1 of the first optical fiber group and an average Brillouin frequency shift v2 of the second optical fiber group is equal to or more than 200 MHz, the difference between v1 and the Brillouin frequency shift of each optical fiber in the first optical fiber group including two or more optical fibers is equal to or less than 40 MHz, and the difference between v2 and the Brillouin frequency shift of each optical fiber in the second optical fiber group including two or more optical fibers is equal to or less than 40 MHz.

5. An optical transmission line according to any one of claims 1 to 4,
wherein the difference in SBS threshold value between the directions when light is incident from the respective ends of the optical transmission line is equal to or less than 2 dB.

6. An optical transmission line according to any one of claims 1 to 4,
wherein the polarization mode dispersion of each optical fiber is equal to or less than 0.2 ps/km$^{1/2}$.

7. An optical transmission line according to any one of claims 1 to 4,
wherein the transmission loss in either one of the optical fibers is 0.176 dB/km or less at the wavelength of 1550 nm.

8. An optical transmission line according to any one of claims 1 to 4,
wherein the loss increment at the 1550 nm wavelength due to bend is equal to or less than 0.5 dB when any of the optical fibers is wound by 10 turns at a diameter of 30 mm.

9. An optical transmission line according to any one of claims 1 to 4,
wherein the cladding region in any of the optical fibers is doped with Fluorine.

10. An optical transmission line according to claim 9,
wherein the core region of the optical fiber is not doped with $GeO_2$.

* * * * *